No. 764,407. PATENTED JULY 5, 1904.
J. E. WOODBRIDGE.
MEANS FOR CONTROLLING THE DIVISION OF LOAD BETWEEN
SYNCHRONOUS MOTOR GENERATOR SETS.
APPLICATION FILED JAN. 9, 1903.
NO MODEL.
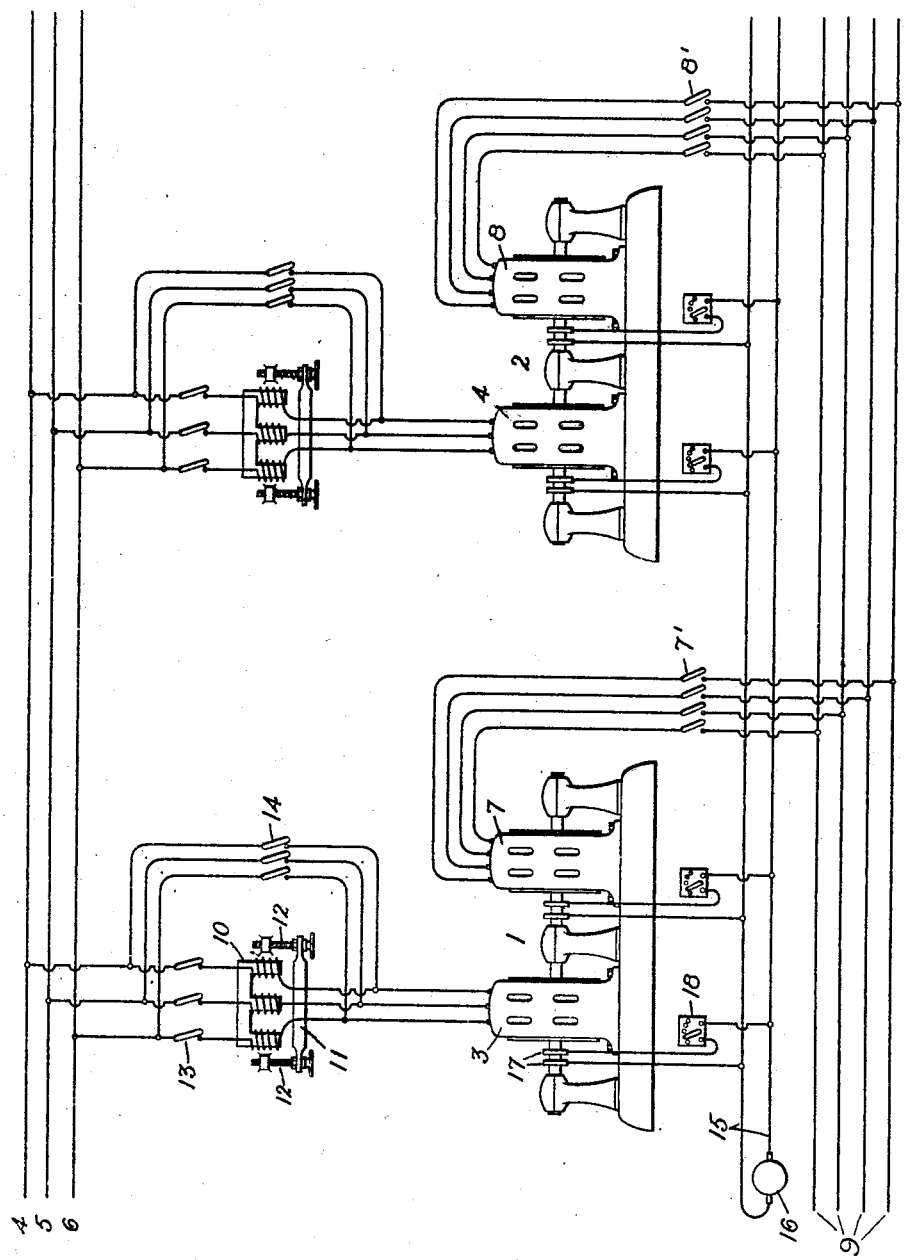
Witnesses.
George H. Tilden.
Helen Orford.
Inventor.
Jonathan E. Woodbridge.
by Albert _____
Att'y.

No. 764,407. Patented July 5, 1904.

UNITED STATES PATENT OFFICE.

JONATHAN E. WOODBRIDGE, OF ALBANY, NEW YORK, ASSIGNOR TO GENERAL ELECTRIC COMPANY, A CORPORATION OF NEW YORK.

MEANS FOR CONTROLLING THE DIVISION OF LOAD BETWEEN SYNCHRONOUS MOTOR-GENERATOR SETS.

SPECIFICATION forming part of Letters Patent No. 764,407, dated July 5, 1904.

Application filed January 9, 1903. Serial No. 138,403. (No model.)

*To all whom it may concern:*

Be it known that I, JONATHAN E. WOODBRIDGE, a citizen of the United States, residing at Albany, county of Albany, State of New York, have invented certain new and useful Improvements in Means for Controlling the Division of Load between Synchronous Motor-Generator Sets, of which the following is a specification.

Considerable difficulty has been experienced in dividing the load properly between two or more synchronous motor-generator sets the corresponding elements of which are connected in parallel.

By the term "synchronous motor-generator set" I refer to a synchronous alternating-current motor having its rotating member geared or otherwise connected to the rotating member of an alternating-current generator so as to supply the driving power for the generator. In case one motor-generator set is operating under considerable load and a second set is connected in parallel with it the latter will frequently refuse to take its share of the load, and manipulation of the field-rheostats of the motors or generators fails to help the matter in any way. I have found, however, that the desired division of load can be effected by inserting more or less reactance in one or both of the motor-circuits. If the reactance be in the circuit of the motor of the unloaded motor-generator set, this set may be caused to take up its share of the load by cutting out the reactance either gradually or suddenly, whereby the motor is caused to run a little in advance, thereby urging forward the generator coupled thereto, and thus causing it to take up its load, the effect being similar to that produced by opening wider the throttle of a steam-engine driving an alternating-current generator in parallel with other generators. The increased power supplied causes an increase in the load carried by the generator.

The features of novelty which characterize my invention I have pointed out with particularity in the appended claims, while the invention itself I have endeavored to make clear by reference to the following description, which is to be taken in connection with the accompanying drawing, which represents in a diagrammatic manner an alternating-current system embodying my invention.

In the drawing I have represented two motor-generator sets 1 and 2, the motor elements of which consist of three-phase synchronous motors 3 and 4, connected in parallel with each other across the three-phase supply-mains 4, 5, and 6, the two-phase alternating-current generators 7 and 8, coupled, respectively, to the driving-motors, being in turn connected in parallel with each other across the mains 9 of a two-phase alternating-current distribution system. Although I have shown the driving-motors as of the three-phase type and the generators corresponding thereto as of the two-phase type, it will be obvious that the number of phases of the motors and generators may be anything desired without departing from my invention and may be either alike for the motors and generators or different, as indicated in the drawings. Furthermore, I have represented the rotating elements of the motor and generator of each motor-generator set as being coupled directly together; but it is obvious that the particular means for mechanical connection may be indefinitely varied without departing from my invention.

In series with the supply-leads of each of the motors of the motor-generator sets I connect a reactive coil, which is preferably adjustable for the purpose of regulating the division of load between the generators of the two sets. The particular means for furnishing reactance to the leads of the motors may assume a wide variety of forms without departing from my invention, and in the drawing I have shown but one of the numerous arrangements which may be used. In this case the three-phase leads are supplied, respectively, with three windings mounted upon the corresponding branches of a three-legged core 10, the magnetic circuits of which are adapted to be closed or opened to a greater or less extent by means of an armature 11, adjustable, by means of screws 12, toward or away from the main core 10. A set of switches 13 serves to close the supply-circuits of the motor through the windings of the reactive coil. Another set of switches, 14, serves to close the circuit from the supply-mains 4, 5, and 6 directly to the motor 3, thereby short-circuiting the reactance-coils, which may be completely cut out of circuit by then opening the switches 13.

The motor 4 of the motor-generator set 2 may have its leads supplied with reactance-coils and controlling-switches of the same description as that set forth in connection with the motor 3 of the set 1. This arrangement is indicated at the upper right-hand portion of the drawing; but being identical in construction with that already described no detailed description thereof is necessary. Switches 7' and 8' serve to connect the generators 7 8 to the mains 9.

The direct-current field-windings of the motor-generator sets may receive their current from any suitable source, in the present instance from a pair of direct-current bus-bars 15, supplied with current from a direct-current generator 16. The leads extending from these bus-bars convey current to the rotating field-magnets of the machines through collector-rings—such, for example, as 17—the intensity of current being adjusted by means of a rheostat, as shown, for example, at 18.

When it is desired to put a motor-generator set into operation with another set already under load, the reactance in the leads of the motor of the latter set is either cut out or reduced to the lowest possible limit, this operation being performed either by means of the switches 14, which cut the reactance out of circuit, or by means of the adjustable armature of the reactance-coil. The motor-generator set which is to be thrown into parallel with the one under load is started up, so that its motor element is being driven from the source of current-supply, while its generator element remains disconnected from the consumption-circuit. The reactance of the newly-started machine is then increased to such a value as to bring the generator element exactly in phase with that of the machine running loaded on minimum or no reactance. The two generator elements are then thrown in parallel with each other, after which the reactance of the newly-started machine is either gradually or suddenly reduced to such an extent as to make the generator pick up its proper share of the load. As the reactance is cut out of the leads of a newly-started motor-generator set the generator element is shifted forward in phase and thereupon commences to pick up its load, the extent to which the load is added being determined by the adjustment of the reactance in the circuits of the driving-motor.

In cutting out any machine the reverse operation may be performed. The reactance in circuit with the machine to be cut out is therefore increased to such an extent that the generator element no longer carries any part of the load, after which the whole set may be out of circuit without any disturbance of the system.

What I claim as new, and desire to secure by Letters Patent of the United States, is—

1. The combination of an alternating-current consumption-circuit, means for supplying alternating current thereto, a motor-generator set consisting of a synchronous motor and an alternating-current generator mechanically coupled together, connections between said generator and said consumption-circuit, leads for supplying alternating current to said synchronous motor, and means for producing a reactive drop of voltage in said leads.

2. The combination of a motor-generator set consisting of an alternating-current generator mechanically coupled to a synchronous motor, and a device possessing reactance adapted to be connected in circuit with the leads of said synchronous motor.

3. The combination of motor-generator sets connected in parallel with each other, and means for adjusting the division of load between said motor-generator sets.

4. The combination of motor-generator sets arranged to operate in parallel with each other, and means for adjusting the relative phase relations of the motor elements of the sets so as thereby to adjust the division of load between the generator elements of the sets.

5. The combination of motor-generator sets arranged to operate in parallel with each other, and means for shifting the phase of the electromotive force at the terminals of one of the motors relatively to the phase or phases of the electromotive forces at the terminals of the motor of another set, thereby adjusting the division of load of the generator elements of said sets.

In witness whereof I have hereunto set my hand this 7th day of January, 1903.

JONATHAN E. WOODBRIDGE.

Witnesses:
    EDWARD WILLIAMS, Jr.,
    HELEN ORFORD.